United States Patent [19]

Conner

[11] 4,100,999

[45] Jul. 18, 1978

[54] DEER HUNTING STAND ATTACHMENT

[76] Inventor: Joe Derrell Conner, 1265 New Hope Rd., Lawrenceville, Ga. 30245

[21] Appl. No.: 794,685

[22] Filed: May 6, 1977

[51] Int. Cl.² .......................... A47C 9/10; E06C 7/16
[52] U.S. Cl. ...................................... 182/122; 182/93; 182/187
[58] Field of Search ............... 182/120, 121, 122, 187, 182/214, 206, 93

[56] References Cited

U.S. PATENT DOCUMENTS

| | | | |
|---|---|---|---|
| 2,876,047 | 3/1959 | La Plante | 182/121 |
| 3,057,431 | 10/1962 | George | 182/214 |
| 3,318,415 | 5/1967 | Christie | 182/214 |
| 3,340,828 | 9/1967 | Smith | 182/187 |
| 4,009,763 | 3/1977 | Hunter | 182/187 |

Primary Examiner—Reinaldo P. Machado
Attorney, Agent, or Firm—Irvin A. Lavine

[57] ABSTRACT

An attachment for a ladder to be used as a stand for a deer hunter. The attachment comprises a pair of spaced coplanar side rails forming a first frame and a pair of spaced coplanar top rails forming a second frame and connected to the upper end of the first frame at an angle of about 90°. An upper shelf providing a seat and a lower shelf providing a foot rest are pivoted to the first frame for extending therefrom or for being folded to lie substantially in the plane of the first frame: brackets limit the position of the shelves. Anchors connect the attachment to a ladder. The attachment has a gripping construction for connection to a tree, carried by the second frame.

13 Claims, 3 Drawing Figures

DEER HUNTING STAND ATTACHMENT

BACKGROUND OF THE INVENTION

The present invention relates to a deer hunting stand, constructed as an attachment for a conventional ladder.

Hunters seeking such game as deer conventionally provide themselves with a so-called hunting stand, which is a seating arrangement that is connected to a tree, generally above eye level of the animal being hunted. Such stands are often permanently constructed, but the permanently constructed stands have many disadvantages, including the necessity of erecting the stand in the woods, away from supplies and the like. Also, the permanent hunting stands lack mobility.

Many suggestions have been made for such stands which are in the nature of specially constructed ladder devices, modified so as to provide not just side rails and rungs, but some supporting surface for the hunter to sit on, as well as to provide structure for anchoring the hunting stand to a tree. These suggested portable hunting stands have been unduly expensive, for the reason that the basic supporting structure, that is, the ladder itself, has been required to be specially made, thereby obviating the ability to use a conventional, and therefore more economical, ladder.

There have also been suggested in the prior art various attachments to be associated with conventional ladders, but these have, in general, had the drawbacks that they have had to have some very special connections with the ladders, thereby increasing the expense, or they have been such as to be unweildly, because they have not been collapsible.

SUMMARY OF THE INVENTION

The present invention provides an attachment which can be quickly attached to a conventional ladder, without modification of the ladder, and which attachment has shelves which are pivoted to it, so that the shelves may be disposed either in a use postion, extending outwardly of the main part or frame of the attachment, or positioned in a collapsed manner, generally parallel to the main frame of the attachment, and therefore readily transportable. The attachment itself includes a main frame having a pair of spaced side rails and transverse connecting members. A first upper shelf is pivotally connected to the main frame, near its upper end, and a second lower shelf is pivoted to the main frame, being spaced below the first shelf about the same distance as the height of the seat of an adult's chair from the floor. The pivotal connections of the shelves to the first or main frame are generally parallel, extending horizontally. To support the shelves in the desired generally horizontally extending use position, collapsible support means are provided, connected to the first, main frame and to each of the shelves. Preferably, these collapsible support means are in the form of brackets made up of a pair of pivotally connected links, the links being pivotally connected to the shelf and to the main frame. At the top of the first or main frame, there is connected a second frame, made up generally of a pair of side rails and a transverse member, and extending at substantially right angles to the plane of the first or main frame. The second frame carries means for anchoring the attachment and the ladder to which it is attached to a tree, and this may take the form of a pair of diverging tree engaging members, and a chain. The first frame includes side rails and transverse members, and U-bolts are provided for attaching the main frame to a conventional ladder, the U-bolts preferably connecting the transverse members of the main frame of the attachment to the side rails of the ladder. The attachment is made primarily of conventional structural members, such as angles.

Among the objects of the present invention are to provide a deer hunting stand which may be readily attached to a conventional ladder without requiring modification of the ladder. Another object is the provision of a deer hunting stand attachment having shelves for supporting a hunter in sitting position, which shelves are movable between a use position extending outwardly of a frame, and a stored position, generally parallel to the frame. Still another object of the present invention is to provide a deer hunting stand attachment for a ladder which is economical, made of conventional and readily obtainable materials, and which is light weight and readily transportable.

Further objects and many of the attendant advantages of the present invention will be more readily understood when considered with the description, claims and drawings forming a part hereof.

DESCRIPTION OF THE PREFERRED EMBODIMENT

Figure 2:
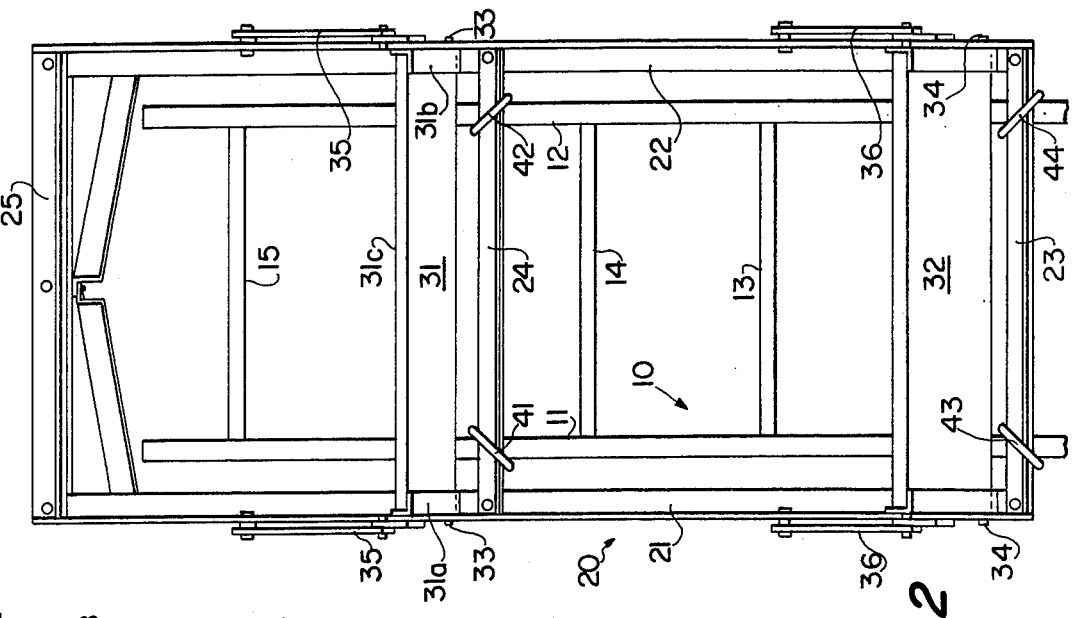
FIG. 2 is a front elevational view of the attachment and ladder as shown in FIG. 1.
Figure 1:
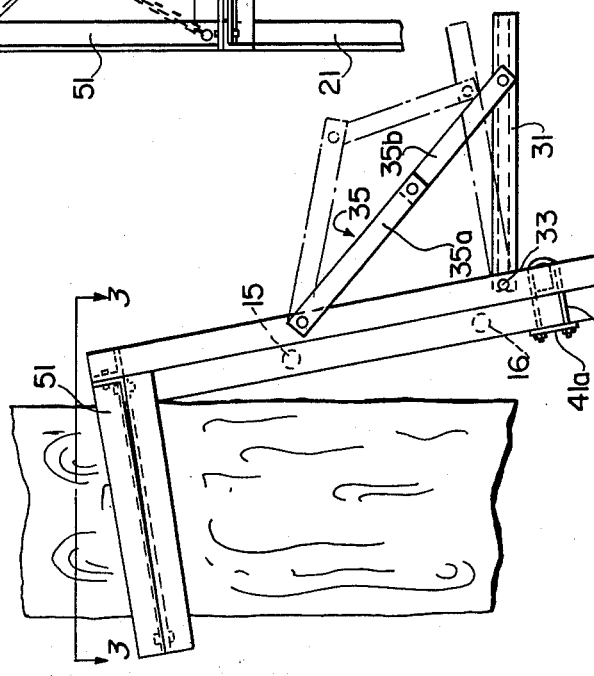
FIG. 1 is an elevational view of a deer hunting attachment in accordance with the present invention, attached to a ladder, and in position on a tree.

Referring now to the drawings, wherein like or corresponding reference numerals are used for like or corresponding parts throughout the several views, there is shown in FIG. 1 the upper part of a conventional ladder generally designated 10, and as shown in FIG. 2, the ladder 10 comprises a pair of spaced, parallel side rails 11 and 12, with transverse rungs 13, 14 and 15. As will be understood, the ladder has more rungs than are shown in FIG. 2, these being designated as 16 and 17 in FIG. 1. It will also be understood that the ladder 10 extends downwardly a substantial distance, the lower end of the ladder being broken away and not shown in the drawings.

The attachment in accordance with the present invention is generally designated 20, and is preferably made of light weight and strong components, such as angles made of aluminum. Referring to FIGS. 1 and 2, the attachment 20 will be seen to comprise a pair of side rails 21 and 22 which are in spaced apart, parallel relationship, and which are slightly wider than the ladder 10, the rails 21 and 22 being connected by transverse members 23, 24 and 25, to thereby form a frame. It is this frame which supports shelves, there being shown a first, upper shelf 31 and a second, lower shelf 32. Shelf 31 is pivotally connected to the side rails 21 and 22 by rivets 33, and shelf 32 is pivotally connected to the side rails 21 and 22 by rivets 34. Thus, the pivotal axes of the shelves 31 and 32 extend transversely of the first frame of the attachment 20 which is formed by the side rails 21 and 22, these pivotal axes being parallel to each other and spaced apart, so that the shelf 31 is spaced above the shelf 32. In the full line position as shown in FIG. 1, which position is also shown in FIG. 2, the shelves 31 and 32 extend outwardly of the frame of the attachment 20 formed by the side rails 21 and 22.

In order to support the shelves 31 and 32 in the noted outwardly extending positions thereof, there are provided suitable support members. Preferably, the support members are in the form of collapsible support brackets, designated 35, and 36, respectively. These support brackets 35 and 36 are substantially identical, and each support bracket 35 comprises a first link 35a which is pivotally connected at one end to the frame of attachment 20 to which the shelf 31 is attached, link 35a being pivotally attached at its other end to the link 35b. The link 35b is, in turn, pivotally attached at its opposite end to the shelf 31. Similarly, the collapsible bracket 36 comprises a similarly attached first link 36a and a second link 36b. As shown in FIG. 2, there are in fact two brackets 35 for the upper shelf 31 and two brackets 36 for the lower shelf 32.

The shelves 31 and 32 are preferably of different sizes, with the shelf 32 extending outwardly a greater length from the pivot 34 than the shelf 31 extends outwardly from the pivot 33. This construction will permit a person to sit upon the shelf 31, and enable his feet to be supported, in a relatively normal position for sitting, on the outer portion of the shelf 32.

In addition, it will be understood that the shelves 31 and 32 in the full line, use position as shown in FIG. 1, and in FIG. 2, are spaced apart vertically substantially the same distance as the height of an adult chair seat is spaced above the floor, so that the hunter can be seated in substantially normal sitting position. The shelves 31 and 32 are spaced apart greater than the spacing of the steps between a ladder.

The pivotal connection of the shelves 31 and 32, and the collapsible brackets 35 and 36 permit the shelves 31 and 32 to be moved from the use position, shown in full line in FIG. 1, to a folded or collapsed position. The dotted line positions of the shelves 31 and 32, brackets 35 and 36, as shown in FIG. 1, is an intermediate position of each, and as will be understood, for transportation purposes, the shelves 31 and 32 may be folded so as to lie in or substantially in the plane of the frame formed by the side rails 21 and 22.

In order to secure the attachment 20 to the ladder 10, there are provided a plurality of U-bolts, there being shown in FIG. 2 four U-bolts designated 41, 42, 43 and 44. Each of the U-bolts is threaded at the ends thereof, to receive nuts; as shown in FIG. 1, a transverse bar 41a is placed over the ends of the U-bolt 41 prior to the positioning of securing nuts on the ends of the U-bolt 41. Referring again to FIG. 2, the U-bolt 41 engages the transverse member 24 forming a part of the frame of attachment 20, and also passes on either side of the rail 11 of the ladder 10. Each of the other U-bolts 42, 43 and 44 is similarly positioned, passing over a transverse member of the frame of the attachment 20 formed by the rails 21 and 22 and the transverse members 23, 24 and passing also over the side rails 11 and 12 of the ladder 10.

Figure 3:
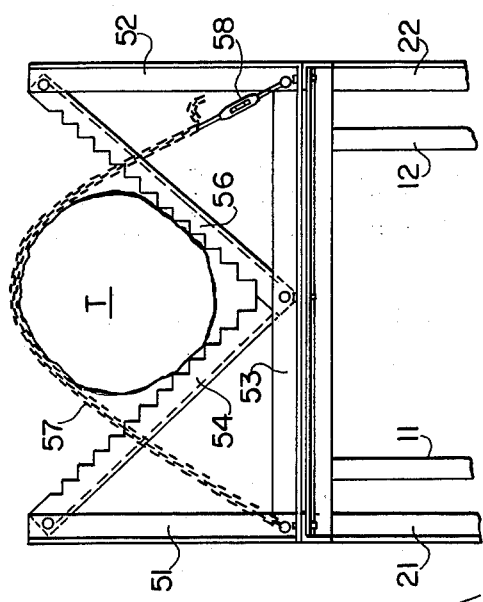
FIG. 3 is a view taken on the line 3—3 of FIG. 1.

The attachment 20 includes a second frame, which is connected to the upper end of the side rails 21 and 22 which form the first frame. The second frame, as shown in FIG. 3, includes a side rail 51 and a side rail 52, joined by a transverse member 53. Connected to the approximate center of the transverse member 53 are a pair of diverging tree-engaging elements 54 and 56, each of which has a toothed edge, as shown. The toothed edges of the diverging tree-engaging elements 54 and 56 enable a secure engagement with a tree T. A chain 57 has one end connected with an end of the transverse member 53, and the other end connected to a turn buckle 58, the opposite end of which is connected to the opposite end of the transverse member 53; the chain 57 encircles the tree T, on the opposite portion thereof from that which is engaged by the diverging tree-engaging elements 54 and 56, so that the diverging tree-engaging elements 54 and 56 and the chain 57 serve to grip the tree T and thereby secure the ladder 10 with the attachment 20 anchored to it to the tree T.

The connection of the second or upper frame, including the rails 51 and 52, to the first frame, including the rails 21 and 22, is accomplished by conventional nuts, bolts and lock washers. Consequently, the upper frame may, if desired, be assembled to the main frame or first frame in the field, being transported disassembled from it. This makes the entire attachment readily transportable, and the ladder itself may be transported either with the attachment 20 connected to it, or separately.

Referring again to FIG. 2, it will be seen that the shelf 31 comprises a pair of angle elements 31a and 31b, in spaced apart, parallel relationship, and with a planar element 31c extending between and resting on the angle elements 31a and 31b. The planar element 31c may be either plywood or an aluminum sheet, suitably ribbed, for strength. The shelf 32 is similarly constructed.

There has been provided an attachment which may be made of light weight and readily obtainable materials, and which can be attached to a conventional ladder, with no modification of the ladder. The attachment herein disclosed provides, when attached to a conventional ladder, a deer hunting stand which is readily transportable, which may be securely attached to a ladder and the combination of the ladder and stand may be securely attached to a tree. Further, the deer hunting stand attachment herein disclosed provides a pair of shelves which are pivotally connected to a frame, so that they may occupy, as desired, folded positions in which they are generally in the plane of the main frame, or outwardly extending positions in which they form a seat and foot rest for a hunter in the normal seated position. Consequently, the herein disclosed deer hunting stand attachment is economical, readily transportable, and entirely serviceable and comfortable in use.

It will be obvious to those skilled in the art that various changes may be made without departing from the spirit of the invention, and therefore the invention is not limited to what is shown in the drawings and described in the specification but only as indicated in the appended claims.

I claim:

1. An attachment for a ladder to provide a deer hunting stand comprising:

means defining a frame, a first upper shelf and a second lower shelf, means pivotally connecting each said shelf to said frame in spaced apart relationship, with the pivotal axes thereof substantially parallel and extending transversely of said first frame, said shelves in one position thereof extending outwardly of said first frame, and collapsible means connected to each said shelf and to a said frame for selectively supporting said shelves in said first position thereof, said shelves being pivotal on said connecting means to a second position substantially parallel to said first frame by collapsing said collapsible supporting means, and a second frame connected to said first mentioned frame, and means carried by said second frame for connecting said attachment to a tree.

2. The attachment of claim 1, said last mentioned means comprising a pair of tree engaging elements in angular relationship, and flexible securing means extending from one side of said second frame to the other side thereof.

3. The attachment of claim 1, said first mentioned frame comprising a pair of coplanar side rails, and transversely extending members joined to said side rails.

4. The attachment of claim 1, wherein said first lower shelf has a greater length from the pivot means to the edge thereof opposite the pivot means than does the second upper shelf.

5. The attachment of claim 4, wherein each said collapsible support means is connected to a said shelf and to said frame.

6. The attachment of claim 5, wherein said collapsible support means comprise plural pivotally connected links.

7. The attachment of claim 1, wherein said collapsible support means comprise plural pivotally connected links.

8. The attachment of claim 7, said links being pivotally connected to said frame.

9. The attachment of claim 1; a ladder including a pair of spaced side rails and transverse rungs joined to said side rails; and detachable connecting means attaching said attachment to said ladder.

10. The combination of claim 9, said last mentioned means comprising U-bolts.

11. The combination of claim 9, said first mentioned frame comprising a pair of side rails spaced apart wider than the side rails of said ladder, transverse members joined to the side rails of said attachment, said connecting means comprising U-bolts connecting transverse members of said first frame and the side rails of said ladder.

12. An attachment for a ladder to provide therewith a deer hunting stand comprising:
frame means adapted to be connected to a conventional ladder and having a longitudinal axis,
a first upper shelf and a second lower shelf,
means pivotally connecting each said shelf to said frame means in spaced relationship with the pivotal axes of said shelves parallel to each other and transverse to the longitudinal axis,
collapsible support means for each shelf extending between and connected to each shelf and said frame means for supporting each said shelf in a position generally transverse of said frame means,
said second lower shelf extending outwardly from said frame means further than said first upper shelf,
said shelves being spaced apart in said extending positions thereof a distance to accommodate a person sitting on said first upper shelf and with the person's feet resting on said second lower shelf in approximately normal sitting position, the spacing of said shelves being substantially greater than the spacing between the steps of a ladder,
said shelves being pivotable on said pivoted means substantially to the plane of said frame means.

13. The attachment of claim 12, and second frame means connected to said first mentioned frame means and extending therefrom oppositely to said shelves, and means carried by said second frame means for anchoring said attachment to a tree.

* * * * *